US008223868B2

(12) United States Patent
Lee (10) Patent No.: US 8,223,868 B2
(45) Date of Patent: Jul. 17, 2012

(54) METHOD OF DETERMINING A VARIABLE QUANTIZATION STEP SIZE FOR IMPROVING CHANNEL DECODING, METHOD AND APPARATUS OF PERFORMING CHANNEL DECODING OPERATION BASED ON A VARIABLE QUANTIZATION STEP SIZE

(75) Inventor: Keun-Moo Lee, Seongnam-si (KR)

(73) Assignee: XRONet Corporation, Gyeonggi-do (KR)

( * ) Notice: Subject to any disclaimer, the term of this patent is extended or adjusted under 35 U.S.C. 154(b) by 576 days.

(21) Appl. No.: 12/311,069

(22) PCT Filed: May 17, 2007

(86) PCT No.: PCT/KR2007/002406
§ 371 (c)(1),
(2), (4) Date: Mar. 18, 2009

(87) PCT Pub. No.: WO2008/038879
PCT Pub. Date: Apr. 3, 2008

(65) Prior Publication Data
US 2009/0238287 A1     Sep. 24, 2009

(30) Foreign Application Priority Data
Sep. 25, 2006   (KR) .................. 10-2006-0093064

(51) Int. Cl.
| H04B 7/02 | (2006.01) |
| H04L 1/02 | (2006.01) |
| H04L 5/12 | (2006.01) |
| H04L 23/02 | (2006.01) |

(52) U.S. Cl. .................. 375/262; 375/267; 375/341

(58) Field of Classification Search .................. 375/260, 375/262, 267, 340, 341
See application file for complete search history.

(56) References Cited

U.S. PATENT DOCUMENTS

| 6,966,024 | B2 | 11/2005 | Park |  |
|---|---|---|---|---|
| 2003/0035589 | A1* | 2/2003 | Kim | 382/239 |
| 2004/0123228 | A1* | 6/2004 | Kikuchi et al. | 714/800 |
| 2004/0128592 | A1 | 7/2004 | Park |  |
| 2005/0025076 | A1* | 2/2005 | Chaudhuri et al. | 370/310 |
| 2007/0086541 | A1* | 4/2007 | Moon et al. | 375/267 |

FOREIGN PATENT DOCUMENTS

| JP | 2002-016578 | 1/2002 |
| KR | 10-1995-0010386 | 4/1995 |
| KR | 10-1995-0022980 | 7/1995 |

OTHER PUBLICATIONS

Abstract for KR 100122749 published Sep. 8, 1997.
Japanese Office Action dated Dec. 27, 2011 issued in Japanese Application No. 2009-529095.

* cited by examiner

Primary Examiner — David B. Lugo
(74) Attorney, Agent, or Firm — Harness, Dickey & Pierce, P.L.C.

(57) ABSTRACT

A method of determining a variable quantization step size is disclosed. In the method of determining a variable quantization step size, a channel characteristic parameter is obtained in order to calculate a quantization step size ($\Delta$) used in channel decoding. The quantization step size ($\Delta$) is variably determined based on the channel characteristic parameter. Therefore, the method of determining a variable quantization step size may improve channel decoding.

17 Claims, 5 Drawing Sheets

METHOD OF DETERMINING A VARIABLE QUANTIZATION STEP SIZE FOR IMPROVING CHANNEL DECODING, METHOD AND APPARATUS OF PERFORMING CHANNEL DECODING OPERATION BASED ON A VARIABLE QUANTIZATION STEP SIZE

TECHNICAL FIELD

The present invention relates to a quantization device of a receiving apparatus, and more particularly to a method of determining a variable quantization step size for improving channel decoding, and a method and an apparatus for performing channel decoding based on a variable quantization step size.

BACKGROUND ART

Next-generation communication systems are configured to perform high-speed data transfers in order to provide good quality of service (QoS) to a user. The next-generation communication systems use orthogonal frequency division multiplexing (OFDM) or orthogonal frequency division multiple access (OFDMA) instead of conventional time division multiple access (TDMA) or code division multiple access (CDMA).

For example, OFDM or OFDMA may be applied to mobile WiMAX systems (IEEE 802.16e-2005), etc.

OFDM is a type of multiple carrier modulation method. According to OFDM, serial data are converted to parallel data and each of the parallel data is modulated into a plurality of subchannels having mutual orthogonality.

Intersymbol interference (ISI), which is originated from multi-path delay spread channel, is inevitable in a mobile communication system and is an important issue for the communication system design. In the system based on OFDM, the effect of ISI changes to the channel variations at frequency domain under the adequate system parameter setting. Therefore, only one-tap equalization is necessary for OFDM system, which is superior to comparing with CDMA and TDMA systems.

In the same manner as other mobile communication systems, the OFDM system uses an interleaving to prevent burst errors and channel coding to improve transmission quality when the signal encounters disturbances (noise, interference, multi-path propagation, etc.).

A receiver based on OFDM may select a hard decision method or a soft decision method in order to decode the channel encoded data.

For example, the hard decision method determines whether a data bit received in a specific section is '0' or '1' based on a predetermined standard (for example, the halfway point of a specific section), and the soft decision method divides a specific section into a plurality of equal intervals (that is, fixed quantization step sizes) and determines a data bit received in the specific section based on the divided intervals. For example, when a resolution is 3 bits, the soft decision method divides the specific section into eight intervals and determines the bits from a range of '0' to '7'.

In the soft decision method, the number of bits used when the receiver of the communication system based on OFDM performs a quantization operation is related to the performance of the receiver. When the number of bits used in the quantization operation is relatively low, the efficiency of channel decoding decreases, whereas when the number of bits used in the quantization operation is relatively high, the complexity of the channel decoding and power consumption increase.

Therefore, the receiver needs to perform the quantization operation according to several conditions. That is, the receiver needs to variably determine the intervals (that is, a quantization step size) that are a standard of the soft decision method in order to reflect the change in characteristics of a log-likelihood ratio (LLR) of an input signal.

DISCLOSURE OF THE INVENTION

Technical Problem

The present invention provides a method of determining a variable quantization step size for improving channel decoding.

The present invention also provides a method and an apparatus for performing channel decoding based on the variable quantization step size.

Technical Solution

In a method of determining a variable quantization step size according to an example embodiment of the present invention, a channel characteristic parameter is obtained in order to calculate a quantization step size ($\Delta$) used in channel decoding. The quantization step size ($\Delta$) is variably determined based on the channel characteristic parameter.

In an example embodiment, the method may further include generating a quantization table based on the calculated quantization step size ($\Delta$).

In an example embodiment, the method may further include receiving a frame from a channel, and the channel characteristic parameter may include an average channel estimation value ($a_{CH}$) generated based on a channel estimation of the frame, a signal-to-noise ratio (SNR) parameter ($a_{SNR}$) obtained based on the SNR of the frame, a modulation parameter ($a_{MOD}$) set according to a receiver system, and a multiple-input multiple-output (MIMO) parameter ($a_{MIMO}$) set according to the receiver system.

In an example embodiment, the frame may correspond to a forward error correction (FEC) block used in either one of orthogonal frequency division multiplexing (OFDM) and orthogonal frequency division multiple access (OFDMA).

In an example embodiment, the average channel estimation value ($a_{CH}$) generated based on the channel estimation of the frame may be calculated. The SNR parameter ($a_{SNR}$) may be obtained based on the SNR of the frame. The modulation parameter ($a_{MOD}$) set according to the receiver system and the MIMO parameter ($a_{MIMO}$) set according to the receiver system may be obtained.

In an example embodiment, the quantization step size ($\Delta$) may satisfy the following equation:

$$\Delta = (a_{CH} \cdot a_{MOD} \cdot a_{MIMO} + a_{SNR})/2^{q-1},$$

where q corresponds to the number of quantization bits.

In a method of performing channel decoding based on a variable quantization step size according to an example embodiment of the present invention, a channel characteristic parameter is obtained in order to calculate a quantization step size ($\Delta$) used in the channel decoding. The quantization step size ($\Delta$) is variably determined based on the channel characteristic parameter. The number of bits inputted to the channel decoding is determined based on the calculated quantization step size ($\Delta$).

In an example embodiment, the method may further include generating a quantization table based on the calculated quantization step size (Δ).

In an example embodiment, the method may further include receiving a frame from a channel, and the channel characteristic parameter may include an average channel estimation value ($a_{CH}$) generated based on a channel estimation of the frame, an SNR parameter ($a_{SNR}$) obtained based on the SNR of the frame, a modulation parameter ($a_{MOD}$) set according to a receiver system, and a multiple-input multiple-output (MIMO) parameter ($a_{MIMO}$) set according to the receiver system.

In an example embodiment, the frame may correspond to an FEC block used in either one of OFDM and OFDMA.

In an example embodiment, the average channel estimation value ($a_{CH}$) generated based on the channel estimation of the frame may be calculated. The SNR parameter ($a_{SNR}$) may be obtained based on the SNR of the frame. The modulation parameter ($a_{MOD}$) set according to the receiver system and the MIMO parameter ($a_{MIMO}$) set according to the receiver system may be obtained.

In an example embodiment, the quantization step size (Δ) may satisfy the following equation:

$$\Delta = (a_{CH} \cdot a_{MOD} \cdot a_{MIMO} + a_{SNR})/2^{q-1}$$

where q corresponds to the number of quantization bits.

In an example embodiment, the number ($CD_{INPUT}$) of bits inputted to the channel decoding may be equal to C, C may satisfy $TH_{C-1} \leq LLR < TH_C$, and $TH_C$ may satisfy the following equation:

$$TH_C = \begin{cases} -\infty & \text{for } C = -1 \\ (C+1-2^{q-1})\Delta & \text{for } C = 0, 1, \ldots, 2^q - 2 \\ \infty & \text{for } C = -2^q - 1 \end{cases}$$

where $CD_{INPUT}$ corresponds to the number of bits inputted to the channel decoding, C corresponds to a constant, LLR corresponds to a calculation result of a log-likelihood ratio (LLR), and q corresponds to the number of quantization bits.

A receiving apparatus according to an example embodiment of the present invention includes a quantization table generation unit and a quantization unit. The quantization table generation unit obtains a channel characteristic parameter in order to calculate a quantization step size (Δ) used in channel decoding and variably determines the quantization step size (Δ) based on the channel characteristic parameter. The quantization unit determines the number of bits inputted to the channel decoding based on the determined quantization step size (Δ).

In an example embodiment, the quantization table generation unit may generate a quantization table based on the calculated quantization step size (Δ).

In an example embodiment, the channel characteristic parameter may include an average channel estimation value ($a_{CH}$) generated based on a channel estimation of the frame, an SNR parameter ($a_{SNR}$) obtained based on the SNR of the frame, a modulation parameter ($a_{MOD}$) set according to a receiver system, and a multiple-input multiple-output (MIMO) parameter ($a_{MIMO}$) set according to the receiver system.

In an example embodiment, the frame may correspond to an FEC block used in either one of OFDM and OFDMA.

In an example embodiment, the quantization step size (Δ) may satisfy the following equation:

$$\Delta = (a_{CH} \cdot a_{MOD} \cdot a_{MIMO} + a_{SNR})/2^{q-1}$$

where q corresponds to the number of quantization bits.

In an example embodiment, the number ($CD_{INPUT}$) of bits inputted to the channel decoding may be equal to C, C may satisfy $TH_{C-1} \leq LLR < TH_C$, and $TH_C$ may satisfy the following equation:

$$TH_C = \begin{cases} -\infty & \text{for } C = -1 \\ (C+1-2^{q-1})\Delta & \text{for } C = 0, 1, \ldots, 2^q - 2 \\ \infty & \text{for } C = -2^q - 1 \end{cases}$$

where $CD_{INPUT}$ corresponds to the number of bits inputted to the channel decoding, C corresponds to a constant, LLR corresponds to a calculation result of an LLR, and q corresponds to the number of quantization bits.

In an example embodiment, the apparatus may further include a channel decoder configured to perform the channel decoding based on the determined number of bits inputted to the channel decoding.

Advantageous Effects

According to the present invention, a method of determining a variable quantization step size may be capable of improving channel decoding.

Also, according to the present invention, a method and an apparatus for performing channel decoding based on a variable quantization step size may be capable of improving the performance of channel decoding.

BEST MODE FOR CARRYING OUT THE INVENTION

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, the present invention will be described in detail with reference to the accompanying drawings.

Figure 1:
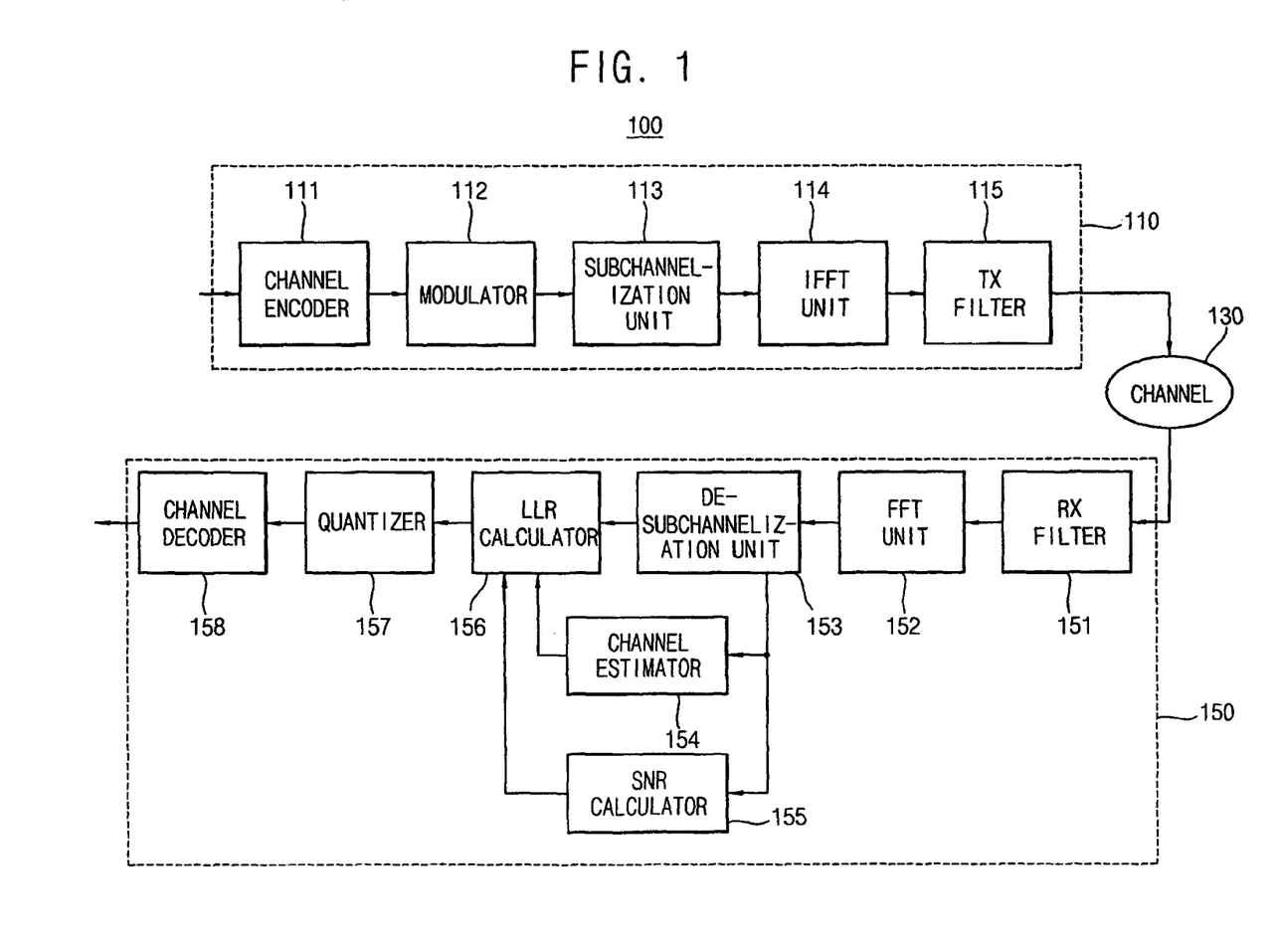
FIG. 1 is a block diagram illustrating a communication system according to an example embodiment of the present invention.

FIG. 1 is a block diagram illustrating a communication system according to an example embodiment of the present invention.

Referring to FIG. 1, a communication system 110 includes a transmitter 110 and a receiver 150. The transmitter 110 includes a channel encoder 111, a modulator 112, a subchannelization unit 113, an inverse fast Fourier transform (IFFT) unit 114 and a transmission filter 115. The receiver 150 includes a reception filter 151, a fast Fourier transform (FFT) unit 152, a desubchannelization unit 153, a channel estimator 154, a signal-to-noise ratio (SNR) calculator 155, a log-likelihood ratio (LLR) calculator 156, a quantizer 157 and a channel decoder 158.

Hereinafter, the operation of the transmitter 110 is described as follows.

The channel encoder 111 performs a channel encoding in order to compensate data damage due to a channel. For example, the channel encoding may include a convolution coding, a turbo coding and/or a low-density parity check (LDPC) coding.

The modulator 112 modulates the channel encoded data using a predetermined method. For example, the modulator 112 may adopt a binary phase-shift keying (BPSK) method, a quadrature phase-shift keying (QPSK) method or a quadrature amplitude modulation (QAM) method.

The subchannelization unit 113 performs a mapping operation on the modulated data to a subcarrier. That is, the subchannelization unit 113 converts the modulated data transmitted in series into parallel data by performing the mapping operation on the modulated data to the subcarrier.

The IFFT unit 114 performs an IFFT operation on the converted data. The transmission filter 115 transmits the IFFT-operated data to a predetermined frequency region.

Hereinafter, the operation of the receiver 150 is described as follows.

The reception filter 151 performs a filtering operation on a signal in a predetermined frequency region.

The FFT unit 152 performs an FFT operation on the filtered data.

The desubchannelization unit 153 converts parallel data that is mapped to the subcarrier into serial data, the channel estimator 154 performs a channel estimation, and the SNR calculator 155 calculates the SNR of a reception signal.

The LLR unit 156 calculates an LLR based on the channel estimation due to the channel estimator 154 and the SNR calculation due to the SNR calculator 155, the quantizer 157 variably determines a quantization step size for a soft decision and determines the number of bits inputted to the channel decoder 158.

The channel decoder 158 performs a channel decoding operation that is an inverse operation of the channel encoding operation that is performed by the channel encoder 111 in the transmitter 110.

Performances of the LLR calculator 156 and the quantizer 157 are described later with reference to FIGS. 4, 5 and 6.

Figure 2:
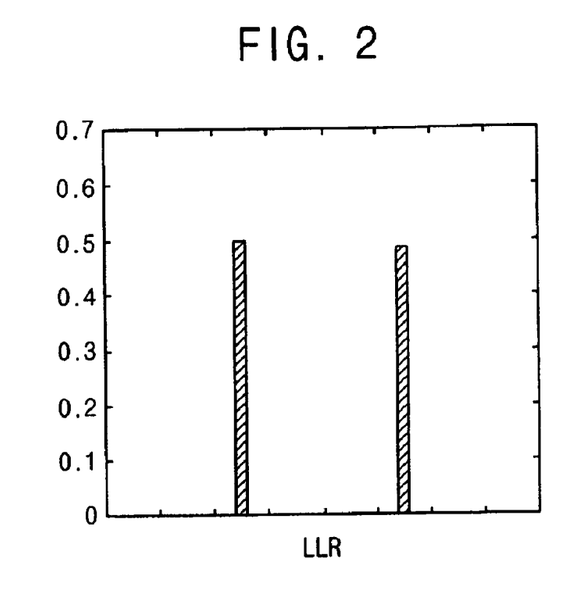
FIG. 2 is a graph illustrating a log-likelihood ratio (LLR) distribution when a signal distortion due to a channel does not occur.
Figure 3:
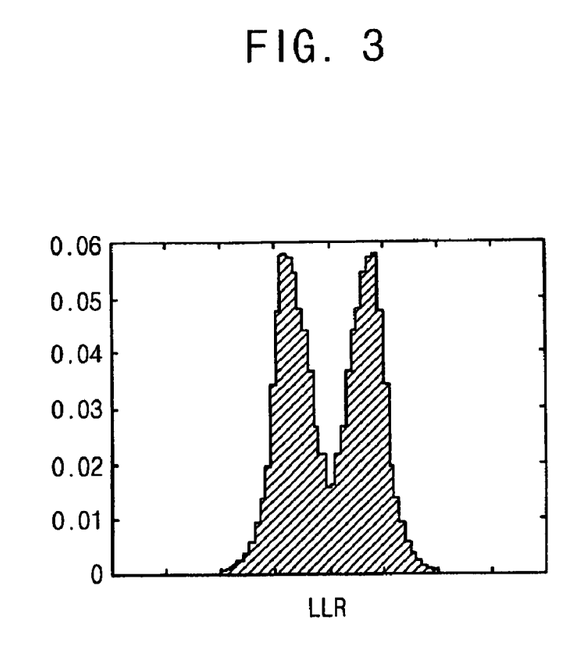
FIG. 3 is a graph illustrating an LLR distribution when a signal distortion due to a channel occurs.

FIG. 2 is a graph illustrating an LLR distribution when a signal distortion due to a channel does not occur, and FIG. 3 is a graph illustrating an LLR distribution when a signal distortion due to a channel occurs.

Referring to FIGS. 2 and 3, a preferable LLR distribution of a reception signal corresponds to a distribution of the reception signal having an exact value as illustrated in FIG. 2. However, in reality, the LLR distribution is changed as illustrated in FIG. 3 because a signal distortion occurs due to multipath fading and additive white gaussian noise (AWGN).

Figure 4:
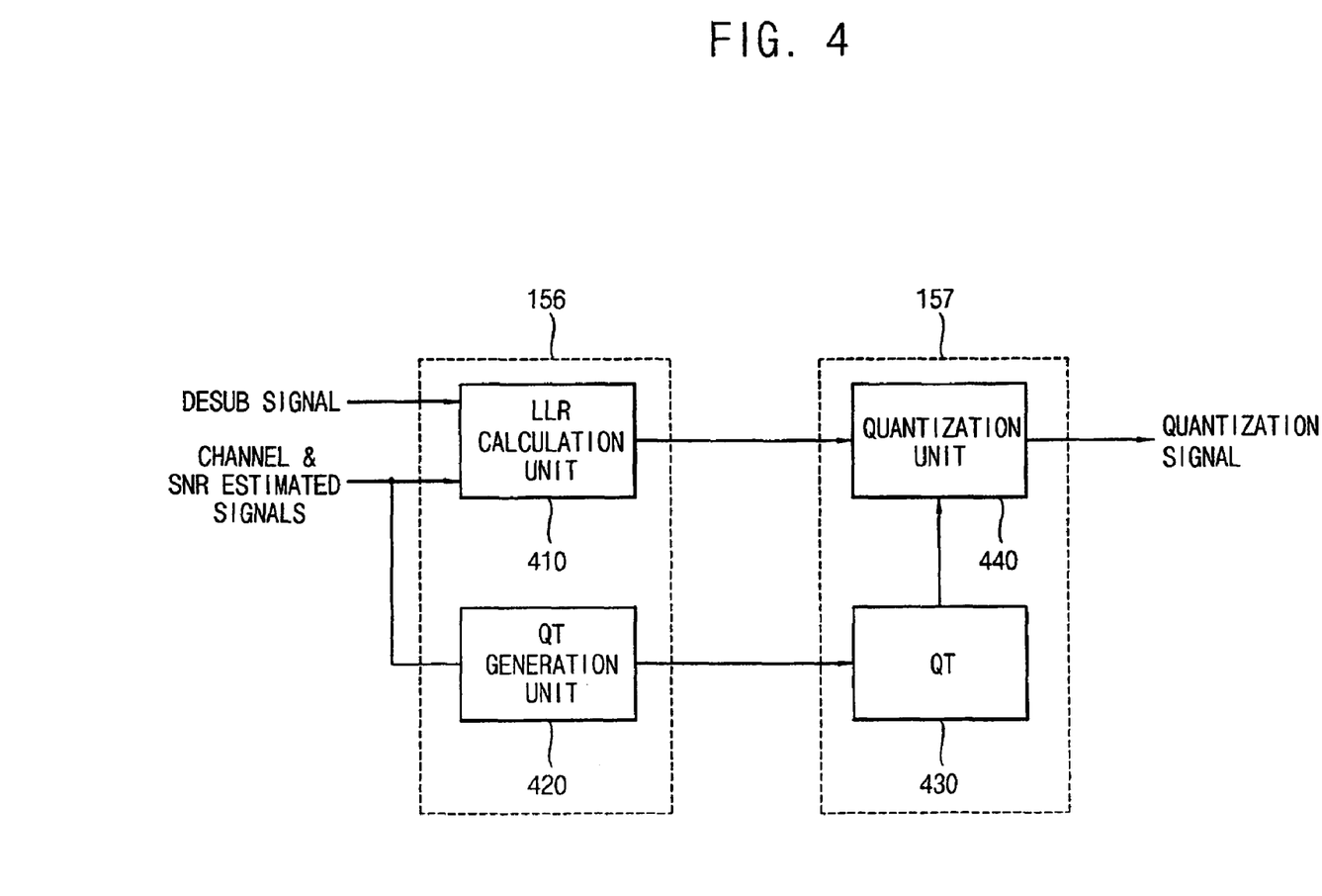
FIG. 4 is a block diagram illustrating an example of the LLR calculator and the quantizer in FIG. 1.
Figure 5:
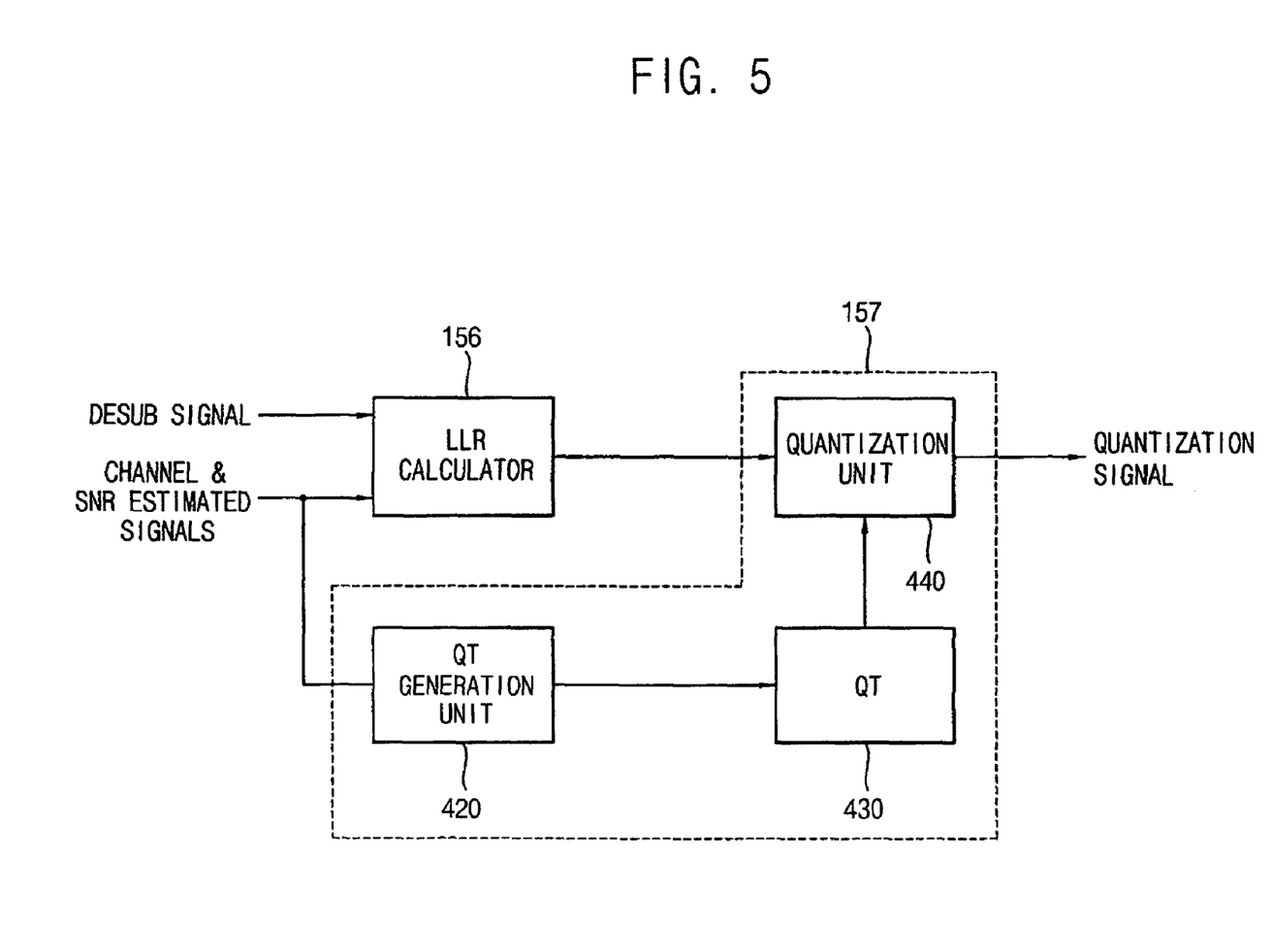
FIG. 5 is a block diagram illustrating another example of the LLR calculator and the quantizer in FIG. 1.

FIG. 4 is a block diagram illustrating an example of the LLR calculator and the quantizer in FIG. 1, and FIG. 5 is a block diagram illustrating another example of the LLR calculator and the quantizer in FIG. 1.

Referring to FIG. 4, the LLR calculator 156 includes an LLR calculation unit 410 and a quantization table generation unit 420, and the quantizer 157 includes a quantization table 430 and a quantization unit 440.

Referring to FIG. 5, the quantizer 157 includes the quantization table generation unit 420, the quantization table 430 and the quantization unit 440.

That is, the quantization table generation unit 420 may be included in either one of the LLR calculator 156 and the quantizer 157.

The quantization table generation unit 420 obtains a channel characteristic parameter in order to calculate a quantization step size ($\Delta$) used when a soft decision for reflecting change characteristics of an LLR distribution is performed, and the quantization table generation unit 420 variably determines the quantization step size ($\Delta$) based on the channel characteristic parameter. The quantization table generation unit 420 may generate the quantization table 430 based on the calculated quantization step size ($\Delta$) for efficient operation of the quantizer 157.

The channel characteristic parameter influences the quantization step size ($\Delta$). For example, the channel characteristic parameter may include an average channel estimation value ($a_{CH}$) generated based on a channel estimation by the channel estimator 154, an SNR parameter ($a_{SNR}$) obtained based on the SNR calculated by the SNR calculator 155, a modulation parameter ($a_{MOD}$) set according to a receiver, and a multiple-input multiple-output (MIMO) parameter ($a_{MIMO}$) set according to the receiver.

The modulation parameter ($a_{MOD}$) is set according to a modulation method selected by the transmitter 110 and the receiver 150. For example, the modulation parameter ($a_{MOD}$) may be set according to a modulation method such as a BPSK method, a QPSK method, a QAM method, etc.

The MIMO parameter ($a_{MIMO}$) is related to the number of antennas used in the transmitter 110 and the receiver 150. MIMO is a technique capable of decreasing signal interference and lowering a transmission speed by transmitting data through a plurality of paths using a plurality of antennas and detecting a signal received through each of the paths in receiver.

For example, the channel estimator 154 and the SNR calculator 155 may be operated based on a frame inputted to the receiver 150. The frame may correspond to a forward error correction (FEC) block used in either one of orthogonal frequency division multiplexing (OFDM) and orthogonal frequency division multiple access (OFDMA).

For example, the quantization step size (Δ) may satisfy Equation 1.

$$\Delta = (a_{CH} \cdot a_{MOD} \cdot a_{MIMO} + a_{SNR})/2^{q-1}, \quad \text{[Equation 1]}$$

where q corresponds to the number of quantization bits.

The quantization unit 440 determines the number of bits inputted to the channel decoder 158. The quantization unit 440 may determine the number of bits based on the quantization table 430 generated by the quantization table generation unit 420 for performing relatively fast calculations.

For example, the number ($CD_{INPUT}$) of bits may satisfy Equation 2.

$$(CD_{INPUT}) = C, \text{ for } TH_{C-1} < LLR < TH_C \quad \text{[Equation 2]}$$

$$TH_C = \begin{cases} -\infty & \text{for } C = -1 \\ (C+1-2^{q-1})\Delta & \text{for } C = 0, 1, \ldots, 2^q - 2 \\ \infty & \text{for } C = -2^q - 1 \end{cases}$$

In Equation 2, $CD_{INPUT}$ corresponds to the number of bits inputted to the channel decoding, C corresponds to a constant, LLR corresponds to a calculation result of an LLR, Δ corresponds to the quantization step size, and q corresponds to the number of quantization bits.

Figure 6:
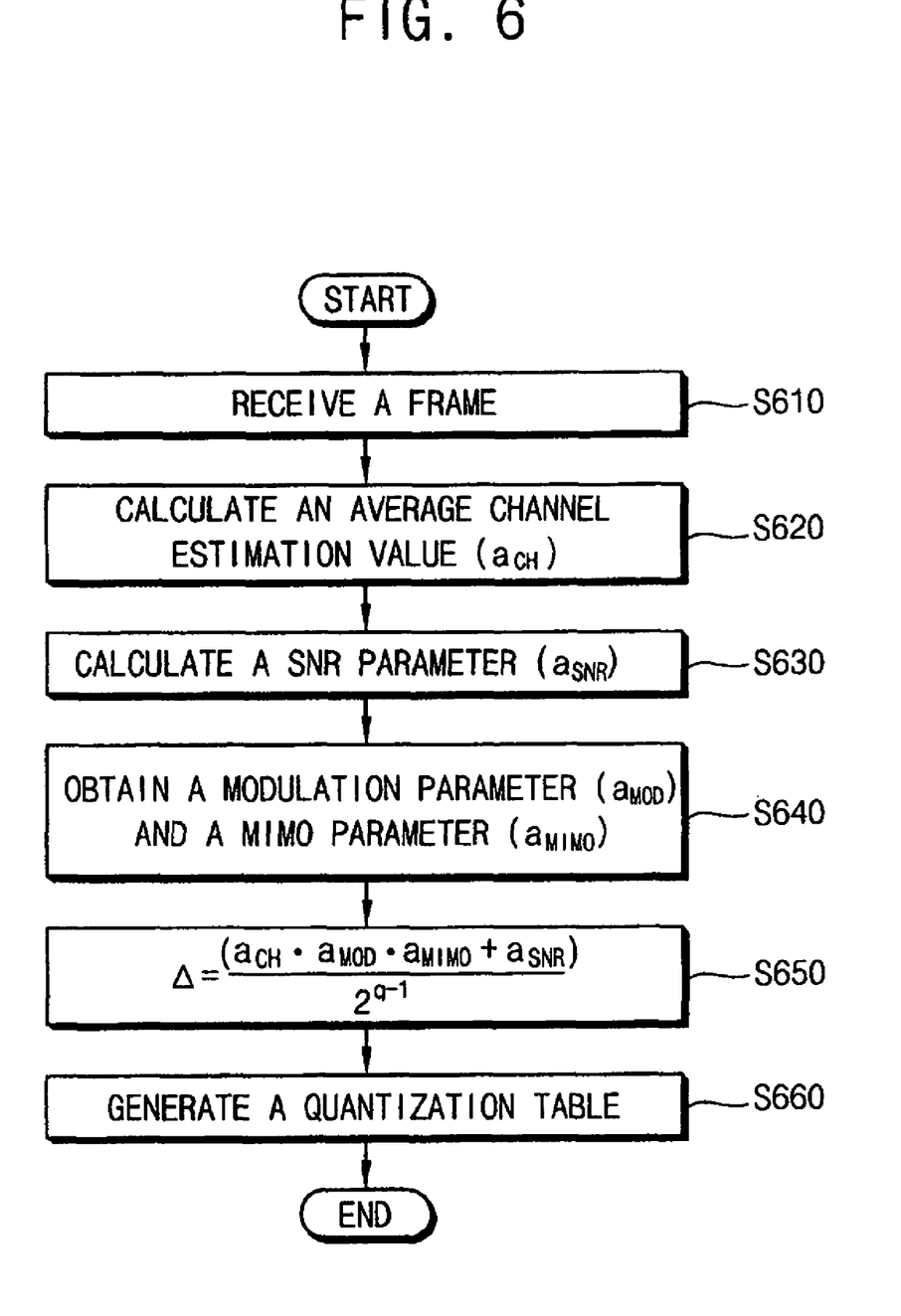
FIG. 6 is a flow chart illustrating a process in which a quantization table is generated by a receiver.

FIG. 6 is a flow chart illustrating a process in which a quantization table is generated by a receiver.

The frame is inputted to the receiver 150 from the channel 130 (step S610). For example, the frame may correspond to an FEC block used in either one of OFDM and OFDMA.

The average channel estimation value ($a_{CH}$) that is an average of a channel estimation calculated by the channel estimator 154 is calculated by the quantization table generation unit 420 (step S620). The SNR parameter ($a_{SNR}$) calculated by the SNR calculator 155 is obtained by the quantization table generation unit 420 (step S630). The modulation parameter ($a_{MOD}$) set according to a receiver 150 and the MIMO parameter ($a_{MIMO}$) set according to the receiver 150 are obtained by the quantization table generation unit 420 (step S640).

The quantization step size (Δ) is calculated as Equation 1 by the quantization table generation unit 420 (step S650). The quantization table 430 is generated by the quantization table generation unit 420 (step S660).

INDUSTRIAL APPLICABILITY

A method of determining a variable quantization step size may improve channel decoding.

A method and an apparatus for performing channel decoding may limit the number of bits used in channel decoding and decrease the power consumption of a receiver by using a variable quantization step size.

Having described the example embodiments of the present invention and its advantages, it is noted that various changes, substitutions and alterations can be made herein without departing from the spirit and scope of the invention as defined by appended claims.

The invention claimed is:

1. A method of determining a variable quantization step size for maximizing the performance of a channel decoder, the method comprising:
   receiving a frame from a channel;
   obtaining a channel characteristic parameter in order to calculate a quantization step size (Δ) used in channel decoding; and
   determining the quantization step size (Δ) variably based on the channel characteristic parameter,
   wherein the channel characteristic parameter includes an average channel estimation value ($a_{CH}$) generated based on a channel estimation of the frame, a signal-to-noise ratio (SNR) parameter ($a_{SNR}$) obtained based on the SNR of the frame, a modulation parameter ($a_{MOD}$) set according to a receiver system, and a multiple-input multiple-output (MIMO) parameter ($a_{MIMO}$) set according to the receiver system.

2. The method of claim 1, further comprising:
   generating a quantization table based on the calculated quantization step size (Δ).

3. The method of claim 1, wherein the frame corresponds to a forward error correction (FEC) block used in either one of orthogonal frequency division multiplexing (OFDM) and orthogonal frequency division multiple access (OFDMA).

4. The method of claim 1, wherein obtaining the channel characteristic parameter comprises:
   calculating the average channel estimation value ($a_{CH}$) generated based on the channel estimation of the frame;
   obtaining the SNR parameter ($a_{SNR}$) based on the SNR of the frame; and
   obtaining the modulation parameter ($a_{MOD}$) set according to the receiver system and the MIMO parameter ($a_{MIMO}$) set according to the receiver system.

5. The method of claim 1, wherein the quantization step size (Δ) satisfies the following equation:

$$(a_{CH} \cdot a_{MOD} \cdot a_{MIMO} + a_{SNR})/2^{q-1},$$

where q corresponds to the number of quantization bits.

6. A method of performing channel decoding based on a variable quantization step size, the method comprising:
   receiving a frame from a channel;
   obtaining a channel characteristic parameter in order to calculate a quantization step size (Δ) used in the channel decoding;
   determining the quantization step size (Δ) variably based on the channel characteristic parameter; and
   determining the number of bits inputted to the channel decoding based on the calculated quantization step size (Δ), wherein the channel characteristic parameter includes an average channel estimation value ($a_{CH}$) generated based on a channel estimation of the frame, an SNR parameter ($a_{SNR}$) obtained based on the SNR of the frame, a modulation parameter ($a_{MOD}$) set according to a receiver system and a multiple-input multiple-output MIMO parameter ($a_{MIMO}$) set according to the receiver system.

7. The method of claim 6, further comprising:
generating a quantization table based on the calculated quantization step size ($\Delta$).

8. The method of claim 6, wherein the frame corresponds to an FEC block used in either one of OFDM and OFDMA.

9. The method of claim 6, wherein obtaining the channel characteristic parameter comprises:
calculating the average channel estimation value ($a_{CH}$) generated based on the channel estimation of the frame;
obtaining the SNR parameter ($a_{SNR}$) based on the SNR of the frame; and
obtaining the modulation parameter ($a_{MOD}$) set according to the receiver system and the MIMO parameter ($a_{MIMO}$) set according to the receiver system.

10. The method of claim 6, wherein the quantization step size ($\Delta$) satisfies the following equation:

$$(a_{CH} \cdot a_{MOD} \cdot a_{MIMO} + a_{SNR})/2q-1,$$

where q corresponds to the number of quantization bits.

11. The method of claim 10, wherein the number ($CD_{INPUT}$) of bits inputted to the channel decoding equals C, C satisfies $TH_{C-1} < LLR < TH_C$, and $TH_C$ satisfies the following equation:

$$TH_C = \begin{cases} -\infty & \text{for } C = -1 \\ (C+1-2^{q-1})\Delta & \text{for } C = 0, 1, \ldots, 2^q - 2 \\ \infty & \text{for } C = -2^q - 1 \end{cases}$$

where $CD_{INPUT}$ corresponds to the number of bits inputted to the channel decoding, C corresponds to a constant, LLR corresponds to a calculation result of a log-likelihood ratio (LLR), and q corresponds to the number of quantization bits.

12. A receiving apparatus, comprising:
a quantization table generation unit configured to obtain a channel characteristic parameter in order to calculate a quantization step size ($\Delta$) used in channel decoding and variably determine a quantization step size ($\Delta$) based on the channel characteristic parameter; and
a quantization unit configured to determine a number of bits inputted to the channel decoding based on the determined quantization step size ($\Delta$),
wherein the channel characteristic parameter includes an average channel estimation value ($a_{CH}$) generated based on a channel estimation of the frame, an SNR parameter ($a_{SNR}$) obtained based on the SNR of the frame, a modulation parameter ($a_{MOD}$) set according to a receiver system, and a multiple-input multiple-output (MIMO) parameter ($a_{MIMO}$) set according to the receiver system.

13. The apparatus of claim 12, wherein quantization table generation unit generates a quantization table based on the calculated quantization step size ($\Delta$).

14. The apparatus of claim 12, wherein the frame corresponds to an FEC block used in either one of OFDM and OFDMA.

15. The apparatus of claim 12, wherein the quantization step size ($\Delta$) satisfies the following equation:

$$(a_{CH} \cdot a_{MOD} \cdot a_{MIMO} + a_{SNR})/2^{q-1},$$

where q corresponds to the number of quantization bits.

16. The apparatus of claim 15, wherein the number ($CD_{INPUT}$) of bits inputted to the channel decoding equals C, C satisfies $TH_{C-1} < LLR < TH_C$, and $TH_C$ satisfies the following equation:

$$TH_C = \begin{cases} -\infty & \text{for } C = -1 \\ (C+1-2^{q-1})\Delta & \text{for } C = 0, 1, \ldots, 2^q - 2 \\ \infty & \text{for } C = -2^q - 1 \end{cases}$$

where $CD_{INPUT}$ corresponds to the number of bits inputted to the channel decoding, C corresponds to a constant, LLR corresponds to a calculation result of an LLR, and q corresponds to the number of quantization bits.

17. The apparatus of claim 12, further comprising:
a channel decoder configured to perform the channel decoding based on the determined number of bits inputted to the channel decoding.

* * * * *